US006944675B2

(12) United States Patent
Fujita

(10) Patent No.: US 6,944,675 B2
(45) Date of Patent: Sep. 13, 2005

(54) QOS-BASED SHORTEST PATH ROUTING FOR HIERARCHICAL COMMUNICATION NETWORK

(75) Inventor: Norihito Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 846 days.

(21) Appl. No.: 09/836,177

(22) Filed: Apr. 18, 2001

(65) Prior Publication Data

US 2001/0032272 A1 Oct. 18, 2001

(30) Foreign Application Priority Data

Apr. 18, 2000 (JP) ........................................ 2000-116943

(51) Int. Cl.[7] ........................ G06F 15/173; G06F 11/00
(52) U.S. Cl. ..................................... 709/240; 370/237
(58) Field of Search ................................. 709/238–245; 370/238, 389, 237

(56) References Cited

U.S. PATENT DOCUMENTS

| 5,933,425 | A | * | 8/1999 | Iwata ........................... 370/238 |
| 6,055,561 | A | * | 4/2000 | Feldman et al. ............. 709/238 |
| 6,094,687 | A | * | 7/2000 | Drake et al. ................. 709/241 |
| 6,141,325 | A | * | 10/2000 | Gerstel ......................... 370/238 |
| 6,600,724 | B1 | * | 7/2003 | Cheng .......................... 370/256 |
| 6,633,544 | B1 | * | 10/2003 | Rexford et al. .............. 370/238 |
| 6,661,797 | B1 | * | 12/2003 | Goel et al. ................... 709/240 |

OTHER PUBLICATIONS

Apostolopoulos et al. "Implementation and Performance Measurements of QoS Routing Extensions to OSPF", INFO-COM '99, IEEE, 1999.*
Crawley et al. "A framework for QoS–based Routing in the Internet", RFC 2386, Aug. 1998.*
Van der Zee, Martin "Quality of Service Routing, State of the Art Report", Ericsson Open report, Jul. 8, 1999.*
Zhang et al. "Quality of Service Extensions to OSPF or Quality of Service Path First Routing (QOSPF)" IETF Internet–Draft, Sep. 1997. <draft–zhang–qos–ospf–01.txt>.*
RFC 2676 "QoS Routing Mechanisms and OSPF Extensions", Aug. 1999.*
RFC 2328 "OSPF Version 2" Apr. 1998.*
Apostolopoulos, G., et al., Request for Comments: 2676 (rfc2676.txt), "QoS Routing Mechanisms and OSPF Extensions", Siara Systems, The Internet Society, Aug. 1999, pp. 1–50.
Moy, J., Request for Comments 2328 (rfc2328.txt), "OSPF Version 2", Asend Communications, Inc., The Internet Society, Apr. 1998, pp. 1–244.

* cited by examiner

Primary Examiner—Ario Etienne
Assistant Examiner—David Lazaro
(74) Attorney, Agent, or Firm—Foley & Lardner LLP

(57) ABSTRACT

A router has a network topology table and a number of resource tables corresponding to network areas. In response to a user's request, one of entries of the topology table and one of the resource tables are referenced and a traversable area along the route to the destination and links of the area which satisfy a user-specified QoS value are selected. A calculation is performed on the selected links according to the Dijkstra algorithm to find a shortest path to the destination if the referenced entry indicates that the destination is in the local area of the router. If the entry indicates otherwise, the calculation is continued until a shortest path tree is found for all area border routers of the traversable area or until the calculation terminates if that tree is not found for all such routers, and a route having an optimum QoS value is determined from the shortest path tree.

12 Claims, 5 Drawing Sheets

FIG. 3A

| RESOURCE TABLE (AREA 4) | INCOMING | | | | |
|---|---|---|---|---|---|
| | ROUTER 41 | ROUTER 42 | ROUTER 43 | ROUTER 44 | ROUTER 45 |
| OUTGOING ROUTER 41 | — | 20 | 20 | — | — |
| ROUTER 42 | 5 | — | 20 | 20 | — |
| ROUTER 43 | 20 | 20 | — | — | 20 |
| ROUTER 44 | — | 20 | — | — | — |
| ROUTER 45 | — | — | 20 | — | — |

(Mbps)

FIG. 3B

| RESOURCE TABLE (BACKBONE 5) | INCOMING | | | | | | |
|---|---|---|---|---|---|---|---|
| | R44 | R45 | R51 | R52 | R53 | R61 | R62 |
| OUTGOING ROUTER 44 | — | — | 20 | — | — | — | — |
| ROUTER 45 | — | — | — | 20 | — | — | — |
| ROUTER 51 | 20 | — | — | 10 | 20 | — | — |
| ROUTER 52 | — | 20 | 20 | — | 10 | 20 | — |
| ROUTER 53 | — | — | 20 | 20 | — | — | 20 |
| ROUTER 61 | — | — | — | 20 | — | — | — |
| ROUTER 62 | — | — | — | — | 20 | — | — |

(Mbps)

FIG. 3C

| DESTINATION | ABR | HOP COUNT | AVAILABLE BANDWIDTH |
|---|---|---|---|
| NETWORK 60 | ROUTER 61 | 3 | 30 Mbps |
| | ROUTER 62 | 3 | 10 Mbps |

QOS-BASED SHORTEST PATH ROUTING FOR HIERARCHICAL COMMUNICATION NETWORK

BACKGROUND OF THE INVENTION

1. Field of the Invention

The present invention relates generally to communications networks, and more specifically to an on-demand QoS (quality-of-service)-based routing for a hierarchical communication network.

2. Description of the Related Art

RFC (Request for Comments) 2328 and 2676 texts describe a hierarchical communication network in which QoS-based on-demand routing is performed using the OSPF (Open Shortest Path First) algorithm, known as QOSPF (QoS extended OSPF). On-demand QoS routing algorithm is one that determines a QoS route to a user-specified destination using the Dijkstra algorithm. This QoS Touting is particularly useful for QoS-guaranteed networks such as multi-protocol label switching (MPLS) networks, The hierarchical communication network is comprised of a plurality of routers interconnected by links. Each of the routers belongs to one of a plurality of areas, one of which is the backbone area which is traversed by traffic between non-adjacent areas. Adjacent areas are interconnected by at least one router known as an area border router (ABR). If an area border router receives an on-demand QoS route calculation request from a user, requesting a route to a destination that is located in one of its neighboring areas, the router calculates a QoS-based shortest path tree (SPT) according to the Dijkstra algorithm. However, since the router has no knowledge of which areas can be traversed to reach the specified destination, the QoS-SPT calculation must be performed for all of its neighboring areas. Further, the router has no knowledge of which remote area border routers can be used as intermediate routers to reach a remote destination. Therefore, if the destination is in a remote area and can be reached via the backbone area, the QoS-SPT must be calculated for all possible routes of the backbone area from the source router to the remote area border routers, in addition to the QoS-SPT calculations for all possible routes of the local area of the source router. As a result, the prior art routing technique is wasteful of QoS-SPT calculations.

SUMMARY OF THE INVENTION

It is therefore an object of the present invention to provide a hierarchical communication network and a method of communication that eliminate the wasteful route calculations.

Another object of the present invention is to provide QoS-based routing that allows each router of the network to possess the knowledge of all areas that can be traversed in advance of selecting links.

A further object of the present invention is to provide QoS-based routing that allows each router of the network to possess, for each traversable area, the knowledge of all area border routers that can be used as transit routers to reach a remote destination via the traversable area.

According to a first aspect of the present invention, there is provided a router for a hierarchical communication network which is divided into a plurality of areas in each of which a plurality of the router are interconnected by links, comprising a first table having a plurality of entries respectively corresponding to reachable destinations, each of the entries including an intra-area or an inter-area indication and an area identifier identifying at least one traversable area and a plurality of second tables respectively corresponding to the areas, each of the second tables holding quality-of-service (QoS) values of the links of the corresponding area. A processor is responsive to a request signal specifying a destination and a QoS value for making reference to one of the entries of the first table and one of the second tabs corresponding to the specified destination, selecting links of the area identified by the area identifier of the referenced entry which links satisfy the specified QoS value, and performing a calculation according to a shortest path finding algorithm on the selected links to find a shortest path to the specified destination if the intra-area indication is included in the referenced entry, or performing the shortest path calculation on the selected links to find a shortest path tree in the identified area and determining a route from the shortest path tree.

According to a second aspect the present invention provides a router for a hierarchical communication network which is divided into a plurality of areas in each of which a plurality of the router are interconnected by links, wherein neighboring ones of the areas are interconnected by at least one area border router. The router comprises a first table having a plurality of entries respectively corresponding to reachable destinations, each of the entries including an intra-area or an inter-area indication, an area identifier identifying at least one traversable area, and a list of area border routers if the inter-area indication is included and a plurality of second tables respectively corresponding to the areas, each of the second tables holding quality-of-service (QoS) values of the links of the corresponding area. A processor is responsive to a request signal specifying a destination and a QoS value for making reference to one of the entries of the first table and one of the second tables corresponding to the specified destination, selecting links of the area identified by the area identifier of the referenced entry which links satisfy the specified QoS value, and performing a calculation according to a shortest path finding algorithm on the selected links to find a shortest path to the specified destination if the intra-area indication is included in the referenced entry, or performing the shortest path calculation on the selected inks until a shortest path tree is found for all routers of the list of the referenced entry or until an end of the calculation is reached when the tree is not found for all the routers if the inter-area indication is included in the referenced entry, and determining from the shortest path tree a route having an optimum QoS value.

According to a third aspect of the present invention, there is provided a hierarchical communication network which is divided into a plurality of areas in each of which a plurality of the router are interconnected by links. Each of the routers comprises a first table having a plurality of entries respectively corresponding to reachable destinations, each of the entries including an intra-area or an inter-area indication and an area identifier identifying at least one traversable area and a plurality of second tables respectively corresponding to the areas, each of the second tables holding quality-of-service (QoS) values of the inks of the corresponding area. A processor is responsive to a request signal specifying a destination and a QoS value for making reference to one of the entries of the first table and one of the second tables corresponding to the specified destination, selecting links of the area identified by the area identifier of the referenced entry which links satisfy the specified QoS value, and performing a calculation according to a shortest path finding algorithm on the selected links to find a shortest path to the specified destination if the intra-area indication is included in the referenced entry, or performing the shortest path calculation on the selected links to find a shortest path tree in the identified area and determining a route from the shortest path tree.

According to a fourth aspect, the present invention provides a hierarchical communication network which is divided into a plurality of areas in each of which a plurality of routers are interconnected by links, wherein neighboring ones of the areas are interconnected by at least one area border touter. Each of the routers comprises a first table having a plurality of entries respectively corresponding to reachable destinations, each of the entries including an intra-area or an inter-area indication, an area identifier identifying at least one traversable area, and a list of area border routers if the inter-area indication is included, and a plurality of second tables respectively corresponding to the areas, each of the second tables holding quality-of-service (QoS) values of the links of the corresponding area. A processor is responsive to a request signal specifying a destination and a QoS value for making reference to one of the entries of the first table and one of the second tables corresponding to the specified destination, selecting links of the area identified by the area identifier of the referenced entry which links satisfy the specified QoS value, and performing a calculation according to a shortest path finding algorithm on the selected links to find a shortest path to the specified destination if the intra-area indication is included in the referenced entry, or performing the shortest path calculation on the selected links until a shortest path tree is found for all routers of the list of the referenced entry or until an end of the calculation is reached when the tree is not found for all the routers if the inter-area indication is included in the referenced entry, and determining from the shortest path tree a route having an optimum QoS value.

According to a fifth aspect of the present invention, there is provided a routing method for a hierarchical communication network which is divided into a plurality of areas in each of which a plurality of the router are interconnected by links, each of the routers comprising a first table having a plurality of entries respectively corresponding to reachable destinations, each of the entries including an intra-area or an inter-area indication and an area identifier identifying at least one traversable area, and a plurality of second tables respectively corresponding-to the areas, each of the second tables holding quality-of-service (QoS) values of the links of the corresponding area, each of the routers functioning as a source router when a request signal is received, The method comprises the steps of receiving, at the source router, a request signal specifying a destination and a QoS value and making reference to one of the entries of the first table and one of the second tables corresponding to the specified destination, selecting links of the area identified by the area identifier of the referenced entry which links satisfy the specified QoS value, and performing a calculation according to a shortest path finding algorithm on the selected links to find a shortest path to the specified destination if the intra-area indication is included in the referenced entry, or performing the shortest path calculation on the selected links to find a shortest path tree in the identified area and determining a route from the shortest path tree.

According to a sixth aspect, the present invention provides a routing method for a hierarchical communication network which is divided into a plurality of areas in each of which a plurality of routers are interconnected by links, the routers of neighboring areas being interconnected by at least one area border router, wherein each of the routers functions as a source router when a request signal is received and includes a first table having a plurality of entries respectively corresponding to reachable destinations, each of the entries including an intra-area or an inter-area indication, an area identifier identifying at least one traversable area, and a list of area border routers if the inter-area indication is included, and a plurality of second tables respectively corresponding to the areas, each of the second tables holding quality-of-service (QoS) values of the links of the corresponding area. The routing method comprises the steps of receiving at the source router, a request signal specifying a destination and a QoS value, for making reference to one of the entries of the first table and one of the second tables corresponding to the specified destination, selecting links of the area identified by the area identifier of the referenced entry which links satisfy the specified QoS value, and performing a calculation according to a shortest path finding algorithm on the selected links to find a shortest path to the specified destination if the intra-area indication is included in the referenced entry, or performing the shortest path calculation on the selected links until a shortest path tree is found for all routers of the list of the referenced entry or until an end of the calculation is reached when the tree is not found for all the routers if the inter-area indication is included in the referenced entry, and determining from the shortest path tree a route having an optimum QoS value.

Due to the listing of the area ID in the first table, the path finding calculation for intra-area destinations is limited only to the local area. Wasteful calculations on unnecessary links for other areas are eliminated.

Further, due to the listing of at least one traversable area ID and the router ID's of corresponding area border routers in the first table, the path finding calculation for inter-area destinations is limited only to the traversable area. Wasteful calculations on unnecessary links for other areas are eliminated. In addition, the amount of shortest path tree calculations is minimized due to the fact that the calculation is performed until a QoS shortest path tree is found for all area border routers of the traversable area or until it terminates of its own accord when such a path is not found for all area border routers.

BRIEF DESCRIPTION OF THE DRAWINGS

The present invention will be described in detail further with reference to the following drawings, in which:

FIGS. 3A, 3B and 3C are illustrations of resource tables of the representative router.

DETAILED DESCRIPTION

Figure 1:
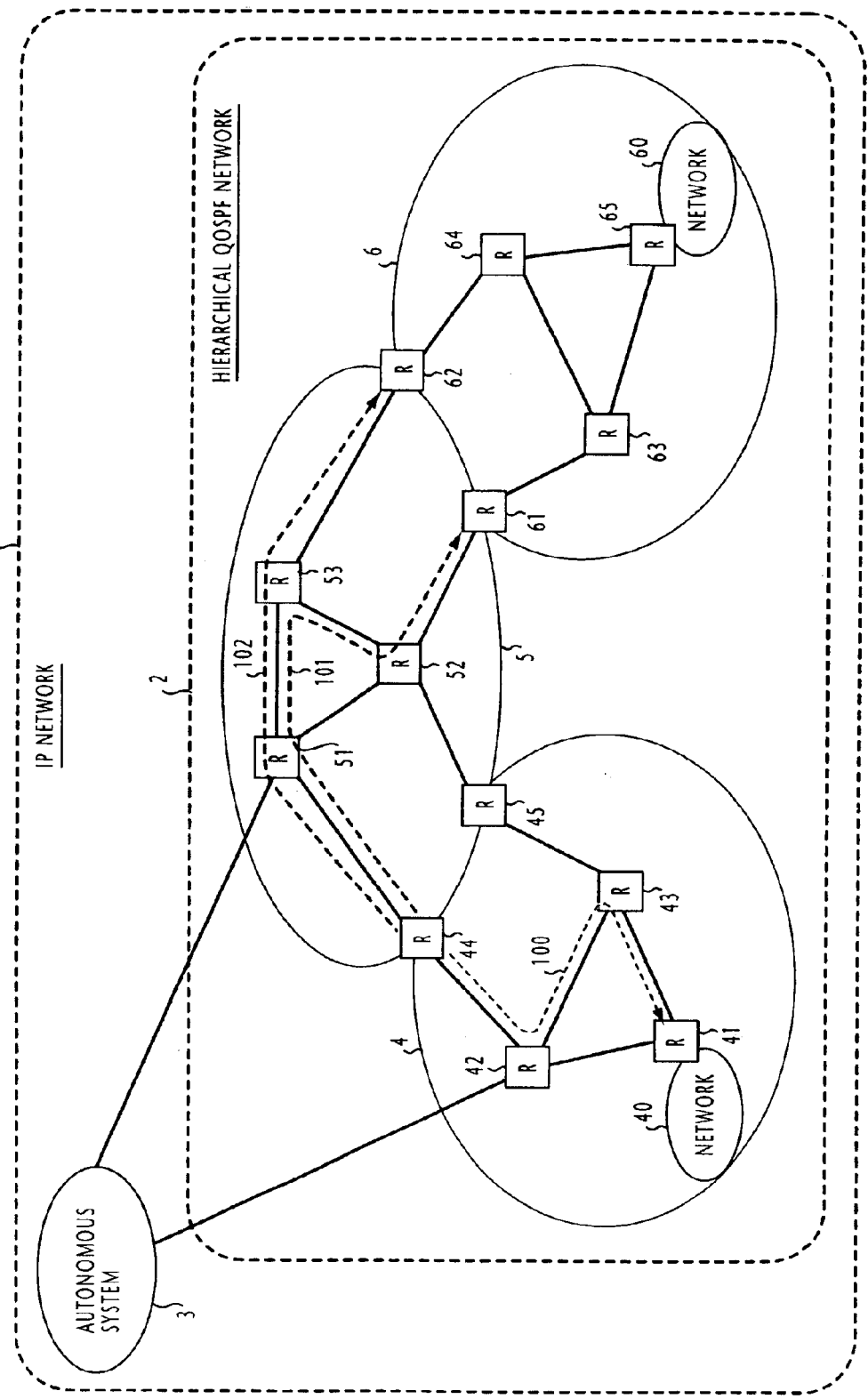
FIG. 1 is a block diagram of an exemplary hierarchical communication network of the present invention.

In FIG. 1 an IP (Internet Protocol) network is illustrated in simplified form in which routing is performed based on a user-requested QoS (quality of service) value in accordance with the present invention. As a typical example, the QOSPF (QoS extended Open Shortest Path First) algorithm will be explained. The IP network 1 is comprised of a hierarchical QOSPF network 2 and an autonomous system 3. The QOSPF network 2, which is also an autonomous system in the IP network, is formed by three OSPF areas 4, 5 and 6, with the area 5 being a backbone area that functions as a core of the QOSPF network. In each of these areas, routers are interconnected as neighbors sharing the same Area identifier (ID) and the routers on the border of two adjacent areas operate as Area Border Routers (ABR). As illustrated, the area 4 is comprised of routers 41 to 45, with the routers 44 and 45 being ABRs connected to routers 51, 52 of the backbone area 5 and the router 41 being connected to a network 40 as a neighbor of the area 4. Area 6 is comprised of routers 61 to 65, with the routers 61 and 62 being ABRs connected to routers 52, 53 of the backbone area 5 and the router 65 being connected to a network 60 as a neighbor of the area 6. Routers 42 and 51 are autonomous system border routers (ASBRs) for the autonomous system 3. Within the OSPF network, the routers send routing updates with the use of link-state advertisement packets, or LSAs such as router LSA, network LSA, summary LSA and AS-external LSA.

Each of the area border routers 44 and 45 shrinks the routing updates of their local area 4 into a summary and sends it to the backbone 5 and shrinks the routing updates of backbone area 5 into a summary for distribution within their local area 4. Likewise, each of the area border routers 61 and 62 shrinks the routing updates of their local area 6 into a summary for distribution to the backbone area 5 and shrinks the routing updates of backbone 5 into a summary for distribution within their local area 6. Note that the summary of backbone 5 distributed within the area 4 also contains the summary of area 6. Hence all routers of area 4 have the knowledge of which destinations are reachable within area 6 as well as within the backbone area 5. Likewise, all routers of area 6 have the knowledge of which destinations are reachable within areas 4 as well as within the backbone area.

Figure 2:
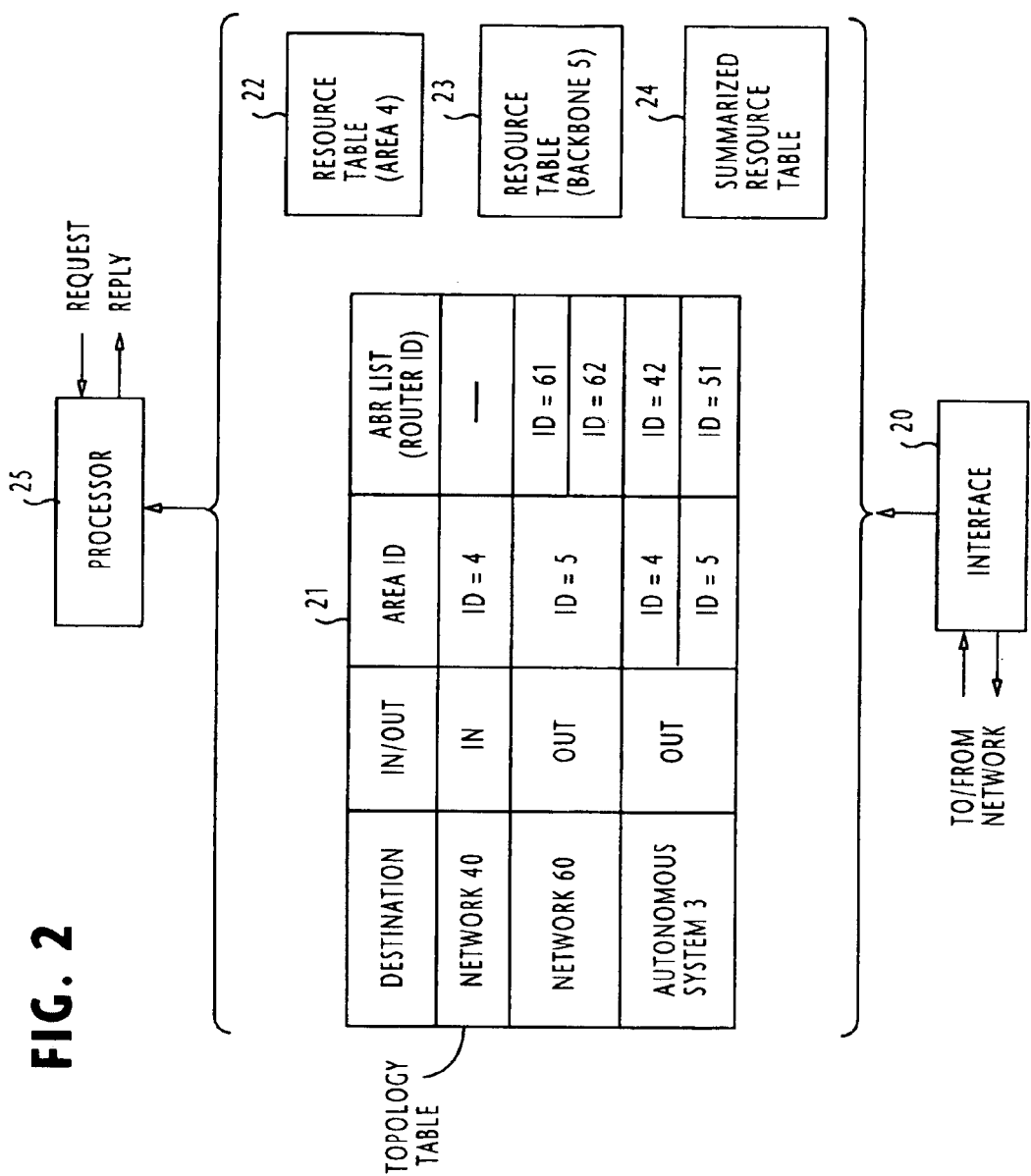
FIG. 2 is a block diagram of a representative router of the network of FIG. 1.

As shown in FIG. 2, each of the routers of the present invention includes an interface 20 connected via communication links to neighboring routers. The interface 20 performs routing with the neighbors according to the routing protocol of the OSPF domain. Interface 20 is associated with a topology table 21 and a plurality of resource tables to maintain network database by exchanging LSAs with neighboring routers. As a representative router, the router 44 may includes a resource table 22 for holding the bandwidth database of its local area 4, a resource table 23 for holding the bandwidth database of the backbone area 5 and a resource table 24 for holding a summarized database of the non-adjacent area 6. More specifically, the summarized resource table 24 contains hop count values and remaining bandwidths of routes from the area border routers 61 and 62 to the network 60.

Topology table 21 has a number of entries respectively corresponding to a plurality of reachable destinations. Each entry is subdivided into a plurality of fields including an IN/OUT field, an AREA ID field, and an ABR LIST field. The IN/OUT field indicates whether the destination of the entry is inside or outside of the local area of the router. The AREA ID field contains the Area IDs of all areas that can be traversed along routes to the destination. The ABR LIST field indicates one or more area border routers (ABRs) along possible routes to the reachable destination.

Router 44, for example, uses LSA packets to create entries for the networks 40 and 60 and the autonomous system 3 in the topology table 21, Specifically, the router 44 examines the router LSA and the network LSA flooded in the local area 4 and recognizes that the network 40 exists within the same area 4 as router 44 and sets an "IN" (intra-area) indication in the IN/OUT field of the topology table 21 and sets ID=4 in the AREA ID field and leaves the ABR LIST field of this entry vacant. Router 44 examines the router LSAs and network LSAs flooded in the areas 4 and 5 and determines that the network 60 is not the same member of the local area 4 and proceeds to examine the summary LSA advertised to the backbone 5 from the routers 61 and 62 and sets an "OUT" (inter-area) indication and ID=5 in the IN/OUT and AREA ID fields of the second entry and sets Routers 61 and 62 in the ABR LIST field. In the case of the autonomous system 3, the router 44 determines that it is not the same member of the area 4 from the router LSA and network LSA flooded in the local area 4 and the backbone area 5 and proceeds to refer to the AS-external LSAs advertised to the OSPF network 2 and sets an "OUT" indication in the IN/OUT field of the third entry, and ID=4 and ID=5 in the AREA ID field, and sets Routers 42 and 51 in the ABR list.

FIGS. 3A, 3B and 3C show details of the resource tables 22, 23 and 24. To create these resource tables, the router 44 uses resource data of active links of area 4 and stores their usable bandwidths for both outgoing and incoming links in the resource table 22. In the same manner, the router 44 stores usable bandwidths of active links of backbone area 5 in the resource table 23. Router 44 is advertised of summarized resource data of active links in the area 6 from the routers 61 and 62 as shown in FIG. 3C.

A processor 25, is connected to the tables 20, 21, 22 and 23. As will be described, the processor 25 is responsive to a request from users to perform on-demand QoS route calculations using the contents of the topology and resource tables and replies with a return message containing the result of the route calculations.

Figure 4A:
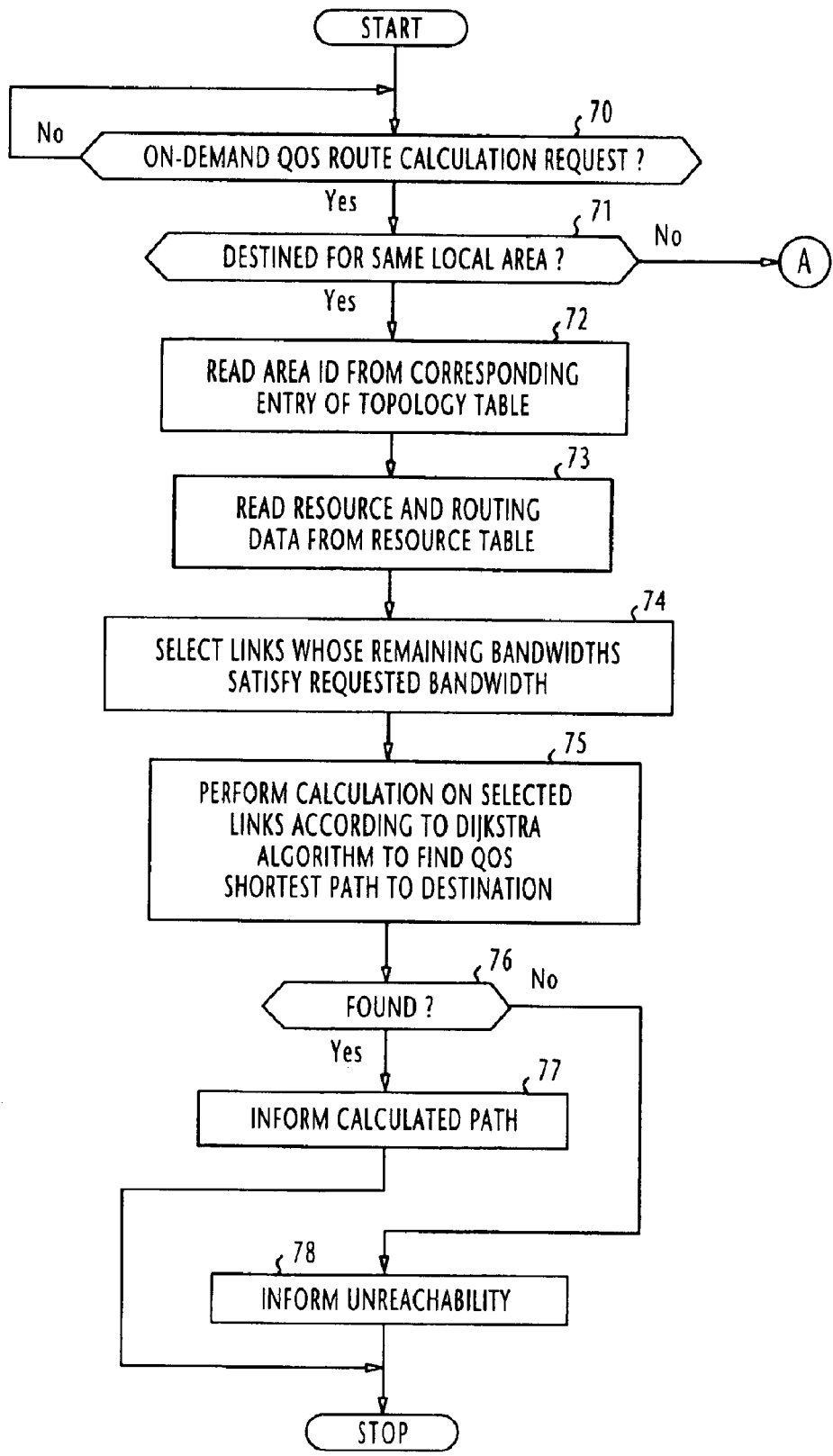
FIGS. 4A and 4B are flowcharts of the operation of the processor of FIG. 2 according to the present invention.
Figure 4B:
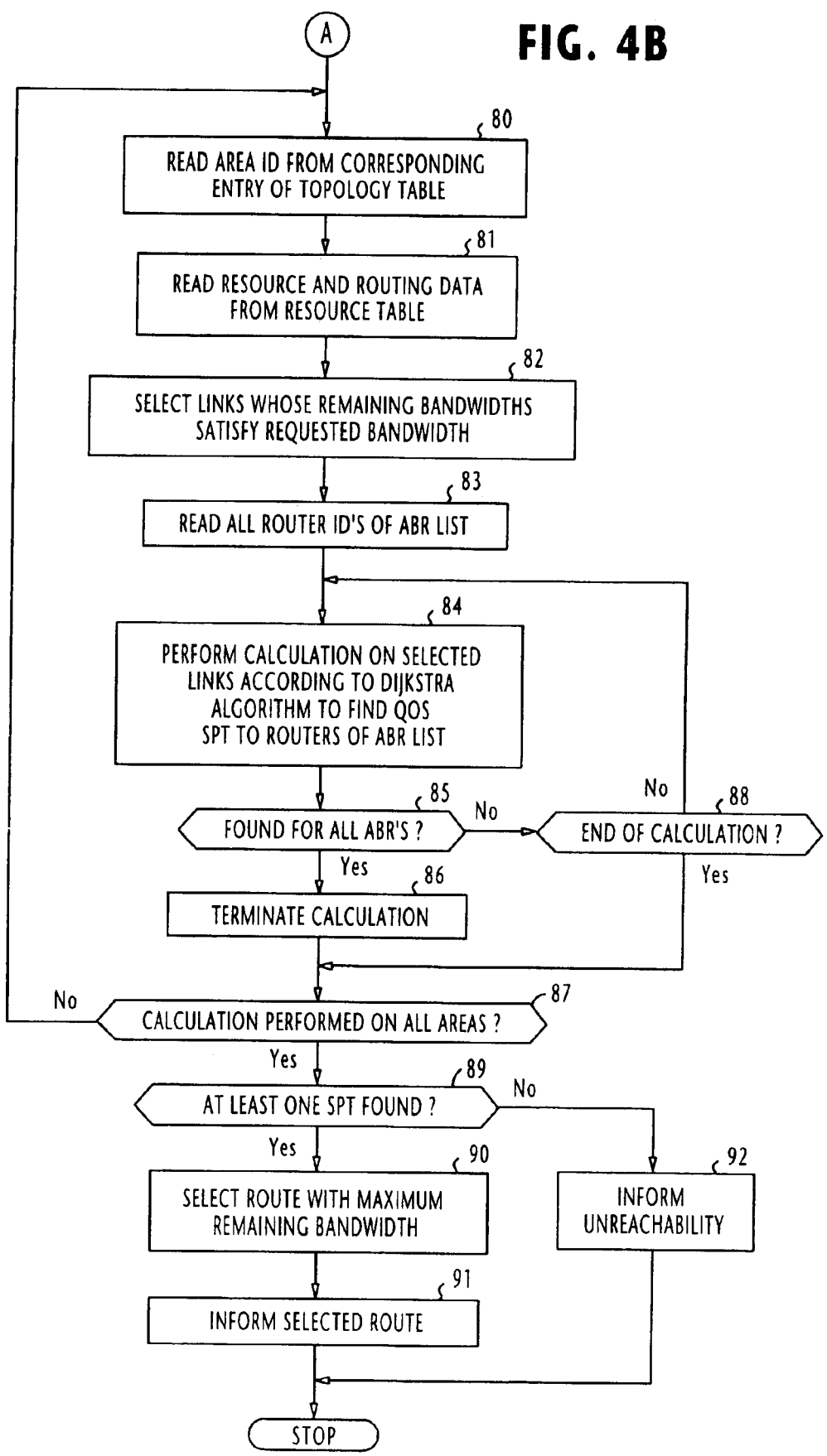

The operation of the processor 25 proceeds according to the flowcharts shown in FIGS. 4A and 4B.

When aft OSPF router receives a request signal from a user for an on-demand QoS route calculation (step 70), the processor 25 proceeds to step 71 to make reference to an entry of the topology table 21 that corresponds to a destination specified in the request signal and reads the IN/OUT field to determine whether the specified destination is inside or outside of the local area of the source router.

At step 72, the processor reads the Area ID of the referenced entry of the topology table. At step 73, the processor makes reference to one of the resource tables that corresponds to the area identified by the read Area ID and reads resource and routing data. At step 74, the processor 25 uses the read routing data to select links whose bandwidths satisfy a value specified in the request signal.

At step 75, the processor 25 performs calculations according to the Dijkstra algorithm on the selected links to find a QoS shortest path to the specified destination. If a shortest path is not found (step 76), a reply message is sent to the requesting user to inform that the destination is unreachable. If the decision is affirmative at step 76, the processor proceeds to step 77 to inform the user of the routing information of the calculated shortest path.

If the destination specified in the request signal is outside of the local area, flow proceeds from step 71 to step 80 (FIG. 4B) to read the Area ID of the referenced entry of the topology table. Processor 25 then makes reference to one of the resource tables that corresponds to the read Area ID (step 81), and uses the read routing data to select links whose bandwidths satisfy the user-specified value (step 82). At step 83, the processor reads all Router ID's of the ABR list of the referenced entry of the topology table.

At step 84, the processor 25 performs calculations according to the Dijkstra algorithm on the selected links to find a QoS shortest path tree to all routers of the ABR list. If a shortest path tree is found for all routers of the ABR list (step 85), the processor terminates the calculation at step 86 and proceeds to step 87. If a shortest path tree is not found for all routers the ABR list, the processor proceeds from step 85 to step 88 to check to see if the calculation has terminated. If not, flow returns to step 84 to continue the calculation. Therefore, if the decision at step 88 is affirmative it can be determined that a shortest path tree has not been found for any router of the ABR list or one has been found for some of the routers of the ABR list.

At step 87, the processor determines whether the above process has been performed on all traversable areas identified by the Area ID's of the referenced entry of the topology table. If not, flow returns to step 80 to read the next Area ID from the referenced entry and repeats until the shortest path finding calculation is performed on QoS-satisfying links of all traversable areas indicated in the referenced entry of the topology table.

Decision step 89 determines whether at least one shortest path tree has been found. If the decision is affirmative, the processor selects a route with a maximum remaining bandwidth from the shortest path tree (step 90) and informs the requesting user of the selected route (step 91). Otherwise, the processor sends a message indicating that the destination is unreachable.

Assume that the processor 25 of router 44 receives an on-demand QoS route calculation request from a user, requesting a 10-Mbps route and specifying the network 40 as a destination (step 70). Processor 25 first looks up the topology table 21 and determines that the destination is in the same local area (step 71), In the topology table 21, the entry of network 40 is referenced for reading the intra-area indication and the Area ID=4 (step 72) and the resource table 22 is referenced corresponding to the Area ID=4 (step 73) for reading the resource and routing data of the local area 4. Links of the area 4 whose remaining bandwidths satisfy the requested 10 Mbps are selected (step 74). Thus, the 5-Mbps outgoing link from router 42 to router 41 is excluded in the link selection process and the processor performs Dijkstra algorithm path finding calculation (step 75) on the selected links to find a route 100 as a shortest path to the destination (see FIG. 1), including the first link from router 44 to router 42, the intermediate link from router 42 to router 43 and the final link from router 43 to router 41.

Thus, due to the listing of the area ID in the topology table, the path finding calculation for intra-area destinations is limited only to the local area. Wasteful calculations on unnecessary links for other areas are eliminated.

If the user requests a 15-Mbps route to the network 60 (step 70), the processor 25 determines that the destination is outside of the local area (step 71). Processor 25 then examines the Area-ID field of the entry and knows that the backbone area 5 is the traversable area and the network 60 can be reached via the backbone area 5. In the topology table, the entry of network 60 is referenced and the Area ID=5 of the backbone area 5 is read (step 80). Processor 25 knows that the network 60 can be reached via links of the backbone area 5 to the routers 61 and 62. Corresponding to Area ID=5, the resource table 23 is referenced (step 81) and links of remaining bandwidth of at least 15-Mbps are selected from this resource table (step 82). Processor 25 reads the router identifiers ID=61 and ID=62 of the ABR list of the referenced entry (step 83). Processor 25 performs the Dijkstra algorithm calculation on the selected links to find a shortest path tree that extends from the source router 44 to the area border routers 61 and 62 (steps 84 to 87). For example, two routes 101 and 102 from the router 44 to area border routers 61 and 62 are selected. Route 101 includes a first link from router 44 to router 51, an intermediate link from router 51 to router 53, an intermediate link from router 53 to router 52 and a final link from router 52 to router 61. Second route 102 includes a first link from router 44 to router 51, an intermediate link from router 51 to router 53 and a final link from router 53 to router 62. Since there is only one Area ID in the entry of the network 60, the processor then proceeds from step 87 to step 89. Since two routes are determined, the processor examines the summarized resource table 24 and compares the two selected routes in terms of bandwidth available to the network 60 in the area 6 or hop count values of routes from the source router 44 to the area border routers 61 and 62.

Thus, due to the listing of at least one traversable area ID and the router ID's of corresponding area border routers in the topology table, the path finding calculation for inter-area destinations is limited only to the traversable area. Wasteful calculations on unnecessary links for other areas are eliminated. Further, the amount of shortest path tree calculations is minimized due to the fact that the calculation is performed until a shortest path tree is found for all area border routers of the traversable area or until it terminates of its own accord when such a path is not found for all area border routers.

If the policy of the OSPF network places priority on bandwidth, the processor makes a decision in favor of the route from the router 61 to the destination because of its greater remaining bandwidth than the route from router 62 to the same destination. Therefore, the requesting user is informed of the route 101 as a best route, If the routes 101 and 102 have different values of minimum bandwidth, the larger of these will also be taken into account in the final process of route selection along with the bandwidths available in the area 6.

If the policy of the OSPF network places priority on hop count value, the processor produces a first sum of the hop count of mute 101 plus the hop count of the route from router 61 to the destination and a second sum of the hop count of route 102 plus the hop count of the route from router 62 to the destination. Since the first sum equals 7 (=4+3) and the second sum equals 6 (=3+3), the processor makes a decision in favor of route 102 because of its smaller total value of hop count to the network 60.

What is claimed is:

1. A router for a hierarchical communication network which is divided into a plurality of areas in each of which a plurality of said router are interconnected by links, comprising:

a first table having a plurality of entries respectively corresponding to reachable destinations, each of the entries including one of an intra-area indication and an inter-area indication and an area identifier identifying at least one traversable area, wherein an intra-area destination is associated with only one area identifier;

at least one second table corresponding to said at least one traversable area, each of said at least one second table holding quality-of-service (QoS) values of only the links of the corresponding at least one traversable area; and a processor, responsive to a request signal specifying a destination and a QoS value, for making reference to one of the entries of the first table and said at least one second table corresponding to the specified destination, selecting links of the area identified by the area identifier of the referenced entry which links satisfy the specified QoS value, and performing a calculation according to a shortest path finding algorithm on the selected links to find a shortest path to the specified destination if the intra-area indication is included in the referenced entry, or performing said shortest path calculation on the selected links to find a shortest path tree in the identified area if the inter-area indication is included in the referenced entry and determining a route from the shortest path tree.

2. A router for a hierarchical communication network which is divided into a plurality of areas in each of which a plurality of said router are interconnected by links, wherein neighboring ones of said areas are interconnected by at least one area border router, comprising:

a first table having a plurality of entries respectively corresponding to reachable destinations, each of the entries including one of an intra-area indication and an inter-area indication, an area identifier identifying at least one traversable area, and a list of area border routers if said inter-area indication is included, wherein an intra-area destination is associated with only one area identifier;

a plurality of second tables respectively corresponding to a corresponding plurality of traversable areas, each of the second tables holding quality-of-service (QoS) values of only the links of the corresponding traversable area; and a processor, responsive to a request signal specifying a destination and a QoS value, for making reference to one of the entries of the first table and one of the second tables corresponding to the specified destination, selecting links of the area identified by the area identifier of the referenced entry which links satisfy the specified QoS value, and performing a calculation according to a shortest path finding algorithm on the selected links to find a shortest path to the specified destination if the intra-area indication is included in the referenced entry, or performing said shortest path calculation on the selected links until a shortest path tree is found for all routers of the list of the referenced entry or until an end of the calculation is reached when said tree is not found for all said routers if the inter-area indication is included in the referenced entry, and determining from the shortest path tree a route having an optimum QoS value.

3. The router of claim 2, further comprising a third table corresponding to a destination reachable via at least one traversable area, said third table containing a plurality of router identifiers identifying a plurality of area border routers and a plurality of QoS values of routes from said plurality of area border routers to the destination, wherein said processor is configured to determine said route depending on said plurality of QoS values.

4. The router of claim 3, wherein said third table further contains a plurality of hop count values of said routes from said plurality of area border routers to the destination, and wherein said processor is configured to determine said route to one of said plurality of area border routers depending on hop count values of said traversable area plus the hop count values of said third table.

5. A hierarchical communication network which is divided into a plurality of areas in each of which a plurality of routers are interconnected by links, each of said routers comprising:

a first table having a plurality of entries respectively corresponding to reachable destinations, each of the entries including one of an intra-area indication and an inter-area indication and an area identifier identifying at least one traversable area, wherein an intra-area destination is associated with only one area identifier;

a plurality of second tables respectively corresponding to said at least one traversable area, each of the second tables holding quality-of-service (QoS) values of only the links of the corresponding area; and a processor, responsive to a request signal specifying a destination and a QoS value, for making reference to one of the entries of the first table and one of the second tables corresponding to the specified destination, selecting links of the area identified by the area identifier of the referenced entry which links satisfy the specified QoS value, and performing a calculation according to a shortest path finding algorithm on the selected links to find a shortest path to the specified destination if the intra-area indication is included in the referenced entry, or performing said shortest path calculation on the selected links to find a shortest path tree in the identified area if the inter-area indication is included in the referenced entry and determining a route from the shortest path tree.

6. A hierarchical communication network which is divided into a plurality of areas in each of which a plurality of routers are interconnected by links, wherein neighboring ones of said areas are interconnected by at least one area border router, each of the routers comprising:

a first table having a plurality of entries respectively corresponding to reachable destinations, each of the entries including one of an intra-area indication and an inter-area indication, an area identifier identifying at least one traversable area, and a list of area border routers if said inter-area indication is included, wherein an intra-area destination associated with only one area identifier;

a plurality of second tables respectively corresponding to a corresponding plurality of traversable areas, each of the second tables holding quality-of-service (QoS) values of only the links of the corresponding traversable area; and a processor, responsive to a request signal specifying a destination and a QoS value, for making reference to one of the entries of the first table and one of the second tables corresponding to the specified destination, selecting links of the area identified by the area identifier of the referenced entry which links satisfying the specified QoS value, and performing a calculation according to a shortest path finding algorithm on the selected links to find a shortest path to the specified destination if the intra-area indication is included in the referenced entry, or performing said shortest path calculation on the selected links until a shortest path tree is found for all routers of the list of the referenced entry or until an end of the calculation is reached when said tree is not found for all said routers if the inter-area indication is included in the referenced entry, and determining from the shortest path tree a route having an optimum QoS value.

7. The network of claim 6, wherein each of said routers further comprises a third table corresponding to a destination reachable via at least one traversable area, said third table containing a plurality of router identifiers identifying a plurality of area border routers and a plurality of QoS values of routes from said plurality of area border routers to the destination, wherein said processor is configured to determine said route depending on said plurality of QoS values.

8. The network of claim 7, wherein said third table further contains a plurality of hop count values of said routes from said plurality of area border routers to the destination, and wherein said processor is configured to determine said route to one of said plurality of area border routers depending on hop count values of said traversable area plus the hop count values of said third table.

9. A routing method for a hierarchical communication network which is divided into a plurality of areas in each of which a plurality of routers are interconnected by links, each of said routers comprising a first table having a plurality of entries respectively corresponding to reachable destinations, each of the entries including one of an intra-area indication and an inter-area indication and an area identifier identifying at least one traversable area, wherein an area destination is associated with only one area identifier, and a plurality of second tables respectively corresponding to a plurality of traversable areas, each of the second tables holding quality-of-service (QoS) values of only the links of the corresponding traversable area, each of said routers functioning as a source router when a request signal is received, the method comprising the steps of:

a) receiving, at the source router, a request signal specifying a destination and a QoS value and making reference to one of the entries of the first table and one of the second tables corresponding to the specified destination;

b) selecting links of the area identified by the area identifier of the referenced entry which links satisfy the specified QoS value; and c) performing a calculation according to a shortest path finding algorithm on the selected links to find a shortest path to the specified destination if the intra-area indication is included in the referenced entry, or performing said shortest path calculation on the selected links to find a shortest path tree in the identified area if the inter-area indication is included in the referenced entry and determining a route from the shortest path tree.

10. A routing method for a hierarchical communication network which is divided into a plurality of areas in each of which a plurality of routers are interconnected by links, the routers of neighboring areas being interconnected by at least one area border router, wherein each of the routers functions as a source router when a request signal is received and includes a first table having a plurality of entries respectively corresponding to reachable destinations, each of the entries including one of an intra-area indication and an inter-area indication, an area identifier identifying at least one traversable area, wherein an intra-area destination is associated with only one area identifier, and a list of area border routers if said inter-area indication is included, and a plurality of second tables respectively corresponding to a plurality of traversable areas, each of the second tables holding quality-of-service (QoS) values of only the links of the corresponding area, the method comprising the steps of:

a) receiving, at said source router, a request signal specifying a destination and a QoS value, for making reference to one of the entries of the first table and one of the second tables corresponding to the specified destination;

b) selecting links of the area identified by the area identifier of the referenced entry which links satisfy the specified QoS value; and c) performing a calculation according to a shortest path finding algorithm on the selected links to find a shortest path to the specified destination if the intra-area indication is included in the referenced entry, or performing said shortest path calculation on the selected links until a shortest path tree is found for all routers of the list of the referenced entry or until an end of the calculation is reached when said tree is not found for all said routers if the inter-area indication is included in the referenced entry, and determining from the shortest path tree a route having an optimum QoS value.

11. The method of claim 10, wherein each of said routers further comprises a third table corresponding to a destination reachable via at least one traversable area from said source router, said third table containing a plurality of router identifiers identifying a plurality of area border routers and a plurality of QoS values of routes from said plurality of area border routers to the destination, wherein the step (c) determines said route depending on said plurality of QoS values.

12. The method of claim 11, wherein said third table further contains a plurality of hop count values of said routes from said plurality of area border routers to the destination, and wherein the step (c) comprises the step of determining said route to one of said plurality of area border routers depending on hop count values of said traversable area plus the hop count values of said third table.

* * * * *